June 12, 1945.  A. J. CAWLEY  2,377,923
ROAD ENGAGING MEANS FOR AUTOMOBILES, OR THE LIKE
Filed Dec. 22, 1938  4 Sheets-Sheet 1
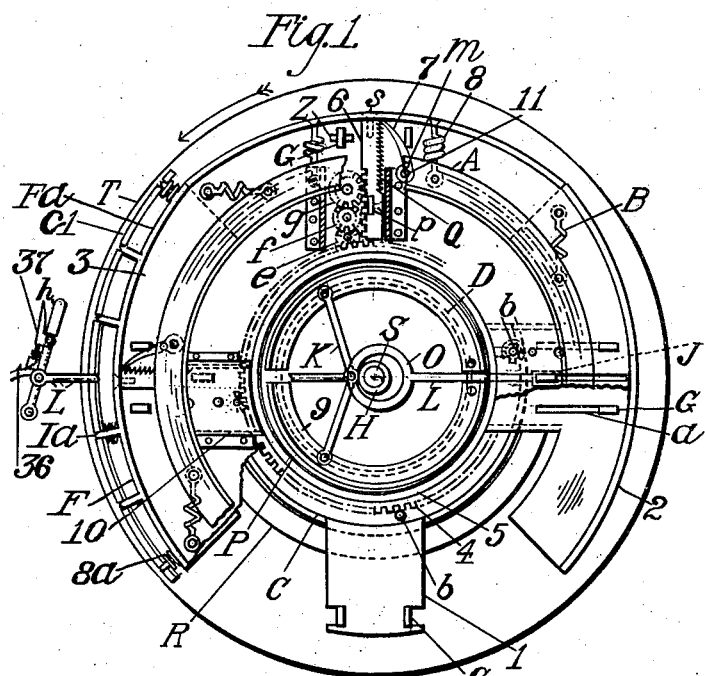
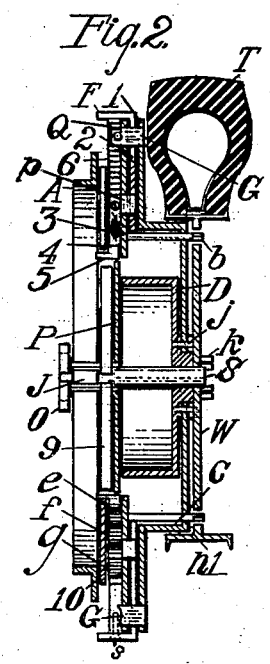
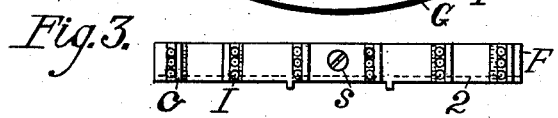
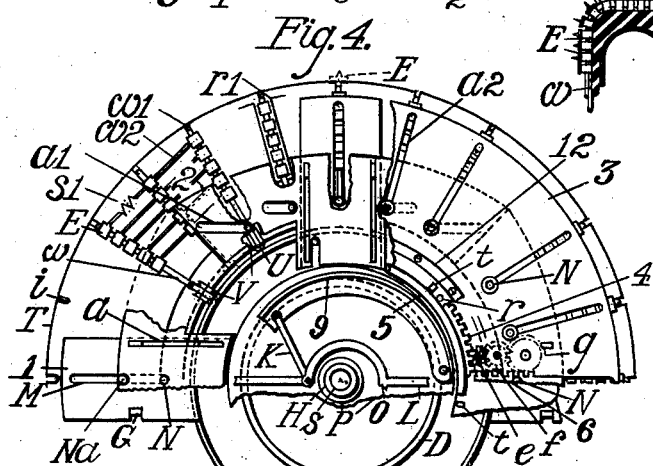
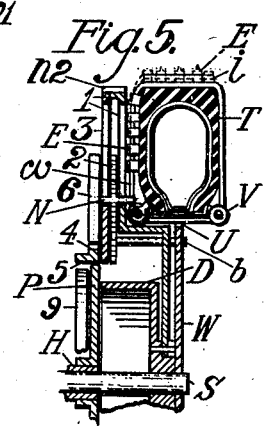
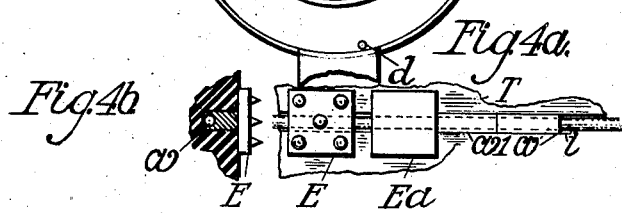

June 12, 1945.  A. J. CAWLEY  2,377,923
ROAD ENGAGING MEANS FOR AUTOMOBILES, OR THE LIKE
Filed Dec. 22, 1938  4 Sheets-Sheet 2

Inventor
Aloysius J. Cawley

A. J. CAWLEY 2,377,923
ROAD ENGAGING MEANS FOR AUTOMOBILES, OR THE LIKE
Filed Dec. 22, 1938

INVENTOR.

June 12, 1945. A. J. CAWLEY 2,377,923
ROAD ENGAGING MEANS FOR AUTOMOBILES, OR THE LIKE
Filed Dec. 22, 1938 4 Sheets-Sheet 4
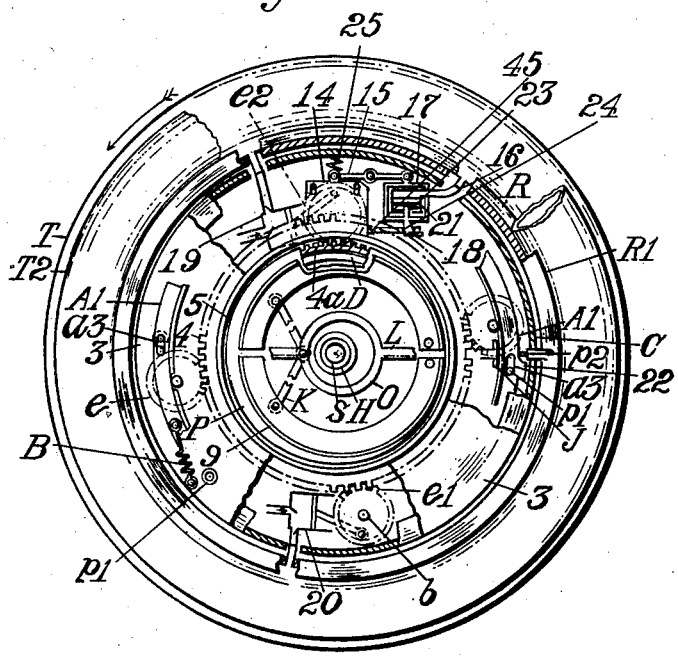
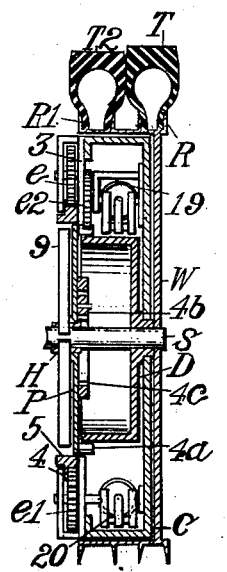
Inventor
Aloysius J. Cawley

Patented June 12, 1945

2,377,923

UNITED STATES PATENT OFFICE 2,377,923

ROAD ENGAGING MEANS FOR AUTOMOBILES OR THE LIKE

Aloysius J. Cawley, Pittston, Pa.

Application December 22, 1938, Serial No. 247,281

28 Claims. (Cl. 301—47)

The invention aims to do away with all of the objectionable features of the present day tire chains, which constitute the present day auxiliary road engaging means, in that the road engaging means may be applied or removed in a fraction of a second while the car is in full motion by utilizing the energy of the motor which operates the car.

The invention relates generally to means applied to automobiles or the like, whereby the surface of the tires or wheels which engage with the road may have auxiliary road engaging means brought into cooperative relation therewith, in order to enable the tires to engage with any type of road and thus eliminate, or greatly reduce slipping of the tires on the road surface. By means of the invention, any type of road engaging means may be applied or removed while the car is moving at full speed without the necessity of the driver leaving the car.

Any type of road engaging means may be applied even though the car is stalled with its wheels rotating in ineffective road engagement and consequent slippage. The mere manipulation of a lever at the driver's seat causes the road engaging means best suited to the particular type of road to come into effective road engagement and the car moves readily forward.

Other objects of the invention are as follows:

To provide a road engaging apparatus which may be applied to a standard, present-day automobile by a simple machining operation on the brake drum in order to prepare it for attachment thereto.

To provide an auxiliary road engaging means which may be applied by means of friction shoes borne on the stationary backing plate.

The provision of chains which actually encircle the tire as in the ordinary tire chains; those chains may be brought into road engagement in a fraction of a second while the car is in full motion.

A tire whose tread is provided with a series of grooves in which the chains travel, and prevent them from being worn when they are in the off position.

Means for releasing the road engaging means from road engagement consisting of a friction ring and means for bringing friction shoes in contact with this ring.

An auxiliary road engaging means in which a hollow wheel is rotatably mounted on the brake drum and a friction band is applied around this wheel in order to retard its rotation when the car moves.

A modification in which the energy of the motor is not utilized to apply the auxiliary road engaging means, and in which a wrench may be applied and the road engaging means brought into road engagement manually.

Another modification in which an auxiliary tire whose tread surface is provided with road engaging elements, and which is partially deflated when not in road engagement, and which is brought into road engagement by inflation.

Means for maintaining the regular tire at full inflation automatically while the car is in motion, the decrease in pressure of the air pressure in the tire acting to bring a tire inflation element into operation.

A road engaging means that is attached to the brake drum and the pressure of the road surface against the auxiliary road engaging means is distributed around the entire periphery of the wheel and road engaging means.

An auxiliary road engaging means and associated wheel which act to reinforce each other, as they are in intimate contact throughout their peripheries.

Different types of road engaging elements are succesively applied to the road surface, and thus ideal engagement is insured with any type of road.

An auxiliary road engaging means that may be applied by passing a wrench through an opening in the wheel while the car is standing, and engaging this wrench with the squared end of a shaft. The wrench, or crank, is then rotated, and the road engaging elements are thereby brought into any desired degree of road engagement, and held there by means of the pawls 7.

Those objects are attained by the mechanisms illustrated in the accompanying drawings, in which—

Figure 1 is an elevational view of one modification of the road engaging means applied to an automobile wheel.

Figure 2 is a side view of Figure 1 partly in cross-section.

Figure 3 is a plan view of the road engaging surface.

Figure 4 is an elvational view of another modification of the road engaging means.

Figure 4a is a plan view of the road engaging surface of the modification illustrated in Figure 4.

Figure 4b is a cross sectional view of Figure 4a.

Figure 5 is a side view of Figure 4 partly in cross-section.

Figure 5a is a side view of a further modification of the means shown in Figure 4 and is partly in cross section.

Figure 14 is an elevational view of still another modification of the invention employing pneumatic means.

Figure 15 is a side view of Figure 14 partly in cross-section.

Figure 6:
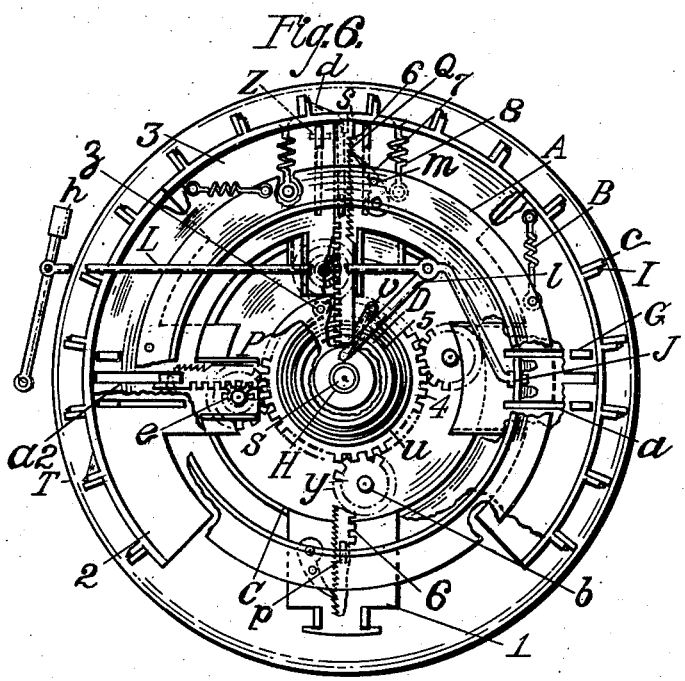
Figure 6 is an elavational view of another modification of the invention applied to an automobile wheel.

Figure 1 illustrates an ordinary automobile wheel, R being its rim and T its tire. The surface of the wheel adjacent the car body is shown in this figure. Figure 2 is a view partly in cross section of Figure 1. Referring to those figures, S represents the shaft while H is the torque tube. The brake drum D is mounted upon the shaft S in the conventional manner. The wheel body W is fastened to the brake drum by the bolts k. P is the backing plate, which is mounted in the regular manner upon the torque tube H. The regulation brake shoes which make frictional contact with the internal surface of the brake drum D are not illustrated, as they would add nothing to the disclosure. Space is left to amply accommodate them, however, as shown in the drawings.

The auxiliary road engaging means about to be described is demountable, just as the wheels are. In order to apply the auxiliary road engaging means to an ordinary wheel, the wheel W is removed by loosening the bolts k and slipping off the wheel. An additional seat is machined on the surface of the brake drum D to accommodate the cup-like member C. Holes are bored in member C and drum D to accommodate the bolts j. The auxiliary road engaging means is then attached by passing the hole in the center of the cup like member C over the projection on the drum, and secured to its seat by means of the bolts j, as better illustrated in Figure 8. The auxiliary road engaging means includes a supporting frame which consists of the cup like portion C, which is provided with radial members l, four being shown, but any number desired may be used. Therefore, C and l act as a supporting frame for the auxiliary road engaging means. The radial members l are provided with guides G. It will be noted that the cup C fits snugly into the hollow of the wheel W, cushioned if desired, by the rubber pads $n_l$. The radial members l may also fit snugly against the tire T. This arrangement causes the pressure of the road surface to be equally distributed over the wheel, giving great strength and yet sufficient resilience. Sliding on the arms l are the quadrants 2, each provided with slots a, through which project the guides G, formed in arms l, permitting a sliding motion of the quadrants. The quadrants 2 are provided with flanges F bearing any suitable road engaging means, which may consist of the usual steel tungstate teeth, so-called "rubber chains," etc., some of which are further illustrated and described in this specification. The movable members, or quadrants, 2, are shown in Figure 1 as being equipped with steel teeth which project through a curved plate Fa, the teeth being shown at Ia. Springs 8a resiliently support Fa. Rubber pads $c_l$ are mounted upon support Fa. As the quadrants 2 move radially, the rubber pads $c_l$ first come into engagement with the road surface and exert moderate pressure, for instance on a wet or slippery concrete pavement. If the latter is coated with a sheet of ice, further outward motion of the quadrants 2 cause the teeth Ia to penetrate the ice and obtain firm engagement. If the road is coated with soft dirt, mud, or snow, further outward or radial travel of quadrants 2 cause the teeth Ia to penetrate very deeply, almost to any desired depth.

Each quadrant 2 is provided with a lug p, which projects outward. Over the four quadrants is placed the ring 3, which is provided with radial slots a, through which pass the lugs p. The ring, or annular member 3 acts to support and guide the quadrants 2, and yet permit their ready sliding to and fro; it also acts to support the flanges F, and most important of all, to distribute the pressure of the road surface equally all over the auxiliary road engaging means and its companion wheel and tire. The guides G, formed on arms l, are secured in any desired manner, as by means of cotter pins Z, to hold the annular member 3 firmly in place, yet permitting the movable members 2 to slide readily to and fro.

It is important to point out that the curvature of the ground gripping element, such as Cl, or c of Figure 3, should be the same as that of the road engaging surface of the tire T, so that all portions will come into uniform road engagement as the wheel rotates. This means that the quadrants are really quadrants of the circle represented by the periphery of the tire surface.

A bar 6, provided on one side with gear teeth constituting a rack and on the other side with ratchet teeth constituting the ratchet Q, is laid over the annular member 3, and is provided with a slot in which the plug p is fastened by means of a screw or the like, as shown in the upper portion of Figure 1. This bar 6 also is attached to the flange F by means of a screw, or the like s, so that the quadrants 2 are rigidly held in position, yet may slide very readily peripherally. Wheels e, f, and g of which there are four sets, of different diameters, are shown in engagement with each other. The larger of this train of wheels g is in engagement with rack on bar 6. By making this wheel of larger diameter than the others, the latter do not engage with the gear teeth on bar 6. However, the same result could be accomplished by making the wheels of the same diameter and inclining the axis of the gear train at an angle to the axis of bar 6 so that but one wheel, g, would be in engagement therewith. Also, by using three wheels instead of one, engagement of wheel g with the rack teeth on 6 is at a point considerably distant from the end of the bar 6. This permits the bar 6 to come almost in contact with wheel 4 in the off-position of the road engaging means and also allowing a considerable distance of travel of the bar 6 affording a greater penetration of the road engaging means in snow and dirt and also affording a greater removal of the teeth or other road engaging element from the surface of the road when not in use. The wheels e, f and g are journalled in the annular member 3. The pawl 7 is fastened by means of the pivot upon the annular member 3. Large gear wheel 4 is placed in engagement with the four wheels e and needs no further radial support. However, it is shown as supported further by means of the casing 10, which holds it laterally and also by means of the thrust bearings t as shown in Figure 4, which are mounted in this casing 10, and also by the similarly mounted radial bearings r (Figure 4) which press against the extending flange or hub of wheel 4. Wheel 4 is therefore, very firmly and yet very movably supported peripherally and needs no central support. It is made hollow and its internal surface 5 constitutes a friction surface which engages with the shoes or friction members 9. The radial and thrust bearings together with the four wheels e act to eliminate friction from the rotation of the wheel 4. Casing 10 also acts as a journalling means for the shafts of the wheels e, f and g. It will readily be seen that, as the car moves, wheel 4 ordinarily rotates with wheel W and tire T. However, if while the wheel W is rotating the shoes 9 are brought in contact with wheel surface 5, the variable amount of friction will cause the wheel 4 to be retarded in its motion to a corresponding variable degree producing a difference in the rate of rotation of wheel W and wheel 4. In other words, the latter rotates relatively to the former, resulting in a corresponding rotation of wheels e, f and g, which in turn produces a radial movement of bar 6 together with the quadrants 2 and their road engaging elements cl, Ia, etc. Pawls 7 engaging with the ratchets Q act to hold the bars in the position of their farthest travel. A flanged ring A is attached by a pivot m to all pawls 7. Springs B which are fastened to this ring A and to the annular member 3, act to hold the pawls in firm engagement with the ratchets Q. Springs 8, fastened to the annular member and flanges F of quadrants 2, act to exert a pull centripetally on the quadrants. The wheel shown in Figure 1 is supposed to be rotating counterclockwise, as indicated by the arrow. It will thus be seen that bars 6 may be held fixedly at any point of its travel by means of the pawls 7, and any degree of road engagement desired may thus be obtained. The housing supporting the wheels e, f and g is shown at 10. The ring A is provided with a flanged portion bearing a friction surface which engages with the shoe J. The handle h which is shown mounted upon the end of the rod L, corresponds in general to the conventional means for applying brakes on vehicles, including the old fashioned "buggy." The conventional handle h and rod L are mounted upon the car body in any of the well-known, conventional manners of mounting the corresponding brake rigging. Therefore, when the lever or handle h is pushed backwards (to the right in Figure 1), the shoe J is forced into contact with the ring A. If the wheel is rotating counterclockwise and pressure is applied to J by the rod L upon which it is mounted, friction is applied to A and it is more or less prevented from rotating, so that its rotary motion is retarded, giving a clockwise pull on the ring A, which in turn pulls on the pawls 7 and disengages them from their ratchets Q and springs 8 cause the return of the movable members bearing the road engaging elements. All pawls 7 are released uniformly and simultaneously, due to their being attached to ring A. Also the centripetal return of the movable members 2 etc., is uniform, as they are all equally connected to wheels e and 4. If the car is stalled in soft, such as muddy, road, it is interesting to note that, since in such a situation the wheels rotate without the car moving, the road engaging means is applied by means of the rotating wheels without any trouble whatever. Thus, a stalled car in soft mud may have the road engaging means applied to the extreme degree of travel of the bar 6 with their flanges and road engaging means Ia and I, etc. In such case, all that is necessary is to push the handle h to the extreme left; rod L is thus moved to the left and the levers K forming a toggle joint, force the shoes 9 with great force against the friction surface 5 of wheel 4 and the road engaging means are applied to the fullest extent. However, if the car starts to move before the extreme travel of the road engaging means is reached, handle h is returned to the neutral position and the degree of road engagement of the engaging means is maintained. If later found unnecessary, pressing the lever to the extreme right causes rod L, which is here shown as provided with a circular opening O to pass around the torque tube H, causes shoe J to engage the friction surface of ring or band A, while wheel W rotates and thus retards the motion of the band, giving a clockwise pull upon it with a corresponding pull on the pawls 7, bringing about their release from the ratchets Q. It is obvious that if, while the car is moving at a great rate of speed, the lever or handle h is pushed suddenly to the left very far, the road engaging means may be applied too far peripherally, and if the road is hard, unpleasant effects would be produced. However, by simply pressing gently on the handle h just enough friction is produced between shoes 9 and surface 5 to apply that degree of road engaging means that is best suited to the road. In such case, the cushions cl, c will come in contact with the road surface with just the right pressure for best engagement. It is important to note that in such case the resistance of the road surface to the advance of the cushions cl,, etc., will be greater than the retarding force produced by friction on the surface 5 by the slight pressure on the handle h. However, in order to avoid a too sudden application of the road engaging means to its fullest extent of travel, a stop 36 is formed in the rack which cooperates with the handle h, preventing it from moving further. The lever h then must be further released by actuating the catch 37 so as to permit its passage over the stop 36, with the result that the lever may be further pushed to the left, if further application of the road engaging means is desirable. Shoes 9 and surface 5 are shown exaggeratedly separated for purposes of illustration. Attention is again called to the great advantage of applying a comparatively slight pressure between the shoes 9 and surface 5, when the road engaging means, in meeting the road surface, is applied to the best degree of road engagement. In such case the resistance to further travel of the road engaging means against the road surface will cause a tight gripping of the road surface, and there will be a slipping of the surface 5 relative to the shoes 9. Thus, the road gripping means best suited to the particular road is automatically obtained by comparatively light pressure on the handle $h$. If it is a wet concrete pavement, the rubber cushions $c$, $c1$, will be applied tightly to the road surface; if an icy pavement, the teeth shown at I Figure 3, and other figures, will penetrate the ice. This figure shows the flange F provided with rubber pads $c$ similar to the so-called "rubber chains" and also with paddles I provided at their tip with sharp points; these may be made of steel tungstate. The proper degree of road engagement is indicated to the operator by the cessation of skidding, or if the car is stalled in the mud, by its proper movement forward. The surfaces of flanges F may be provided with regular lengths of chain, or with pneumatically inflated rubber tubes with specially formed road engaging surfaces.

The handle $h$ may be held in the neutral position, in which neither shoes 9 or J are in contact with their corresponding friction surfaces, by means of two springs (not shown) fastened to the handle $h$ and pulling in opposite directions. If the road engaging means has been applied, it is then left in the exact position in which it was applied. It will be seen that the road engaging means may be applied or removed in the fraction of a second, thus avoiding many fatal accidents, as for instance when the car suddenly encounters a slippery pavement while travelling at full speed.

In Figure 1, the flanges $Fa$ are prevented from travelling too far radially by special lugs (not shown) which are formed on the metal portions $Ia$.

The operation of handle $h$ in applying the road engaging means is comparable to that of the engineer's valve in the railroad air brake system, in that slight movement of the handle causes the road engaging means to go slowly into engagement. Its action is not like that of a brake of an automobile where constant pressure is necessary on the brake handle or pedal. The pawls 7 act to hold the road engaging means in the same degree of engagement that has been given by operation of the handle $h$. Return of the handle to the neutral position does not affect this engagement. To disengage the road engagement, it is only necessary to move handle $h$ to the right from the neutral position, quite similar to the action of the engineers' valve of the air brake system.

Figure 7:
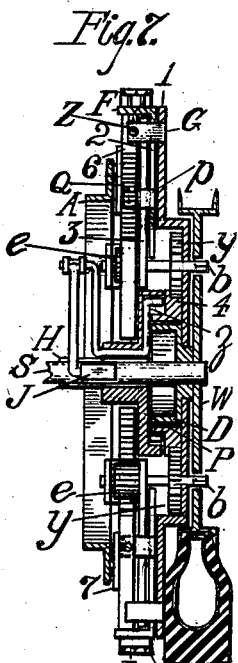
Figure 7 is a side view of Figure 6 and is partly in cross section.
Figure 8:
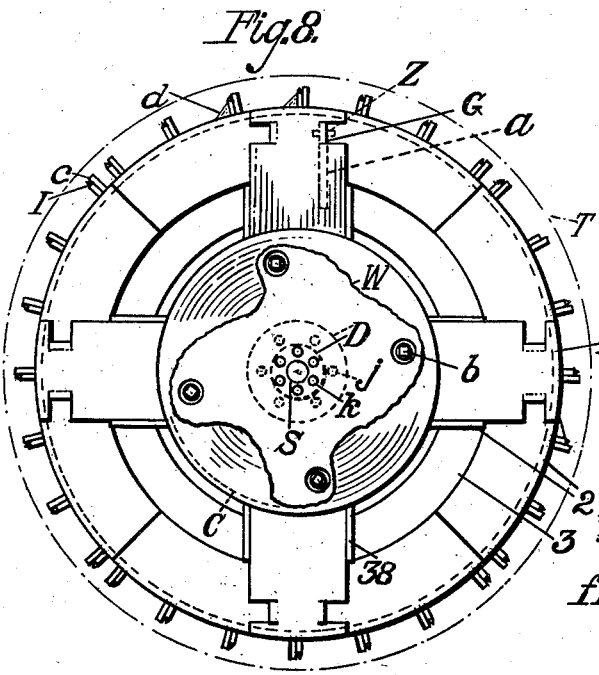
Figure 8 is an elevational view of one modification of the road engaging means illustrating the side of the apparatus adjacent the wheel.

The shaft $b$ of wheel $e$ is shown as squared at its end, which projects through the opening in wheel W, as shown at $b$, Figures 2 and 8. Four such shafts are illustrated, any of which may be used to engage with a wrench $o$, Figure 10. In this way, the road engaging means may be applied when the wheel is not rotating. Simply attaching and turning the wrench $o$ causes rotation of shaft $b$, wheels $e$, $f$, and $g$ and peripheral travel of engaging elements $c$ and I. It may thus be applied without the use of shoes 9, links K, rod L, handle $h$, etc. Those elements could be dispensed with, and still the car would be provided with a means of applying the "chains" in a second or two, and without the necessity of jacking up the car. Figure 7 illustrates that the pawls 7 may be provided also with shafts having squared ends. By applying the wrench $o$ to these, after the brakes have been applied, a slight turn will release all of the pawls 7 simultaneously from their ratchets, and the road engaging means will immediately be placed out of road engagement.

Figure 3 illustrates the surface of flange F; $s$ is the screw which holds F and bar 6 in rigid contact. The quadrant is designated by 2. "Rubber" chains are indicated by $c$, while I is a representation of metal paddles provided with teeth.

Another modification of the invention is illustrated in Figures 4 and 5. The conventional drum D, plate P, shaft S, torque tube H, wheel W are shown. The tire T differs from the ordinary tire in that it is provided with a series of transverse slots $i$ which are deep and narrow. They are not as conspicuous or disfiguring as the ordinary ground grip tires, which are provided with extremely high ridges. Those slots accommodate thick, flexible and strong wires, or several combined strands of piano wire, or chains $w$, which pass through the grooves and around the tire T over pulleys V supported on the wheel rim and through holes U in the wheel W. They include a resilient portion, such as a spring, which keeps them always taut. A portion of this wire or chain is provided with a number of elements E, which consist of a lug fitting the tire groove and through which the wire $w$ passes and is attached to a plate like portion which is flanged over the surface of the tire, so that when the chain or wire is rotated so that the plate-like portions of the elements E are on the tire tread as shown at E at the top of the figures, they are absolutely clear of the grooves and have a more or less large contact surface on the tire tread. They are provided with any type of ground gripping or road engaging means, such as metal teeth, chains, etc. This arrangement is a very near approach to the ordinary chains which are wrapped around the tire. Four quadrants are provided as shown at 2; their slots $a1$ are transverse and of different length. Pivots N engage with and are guided by those slots. The attachment of the radial arms $l$ and the cup like portion C to the brake drum is the same as described in connection with the previous figures. Arms $l$ are provided with slots M, which also guide pivot N. The annular member is provided with radial slots $a2$ through which pivots N also project and are thereby guided. The lugs G on radial arm $l$ are placed more centrally than in the other modifications described. Also, the quadrants 2 have a shorter radius and travel very far, as indicated by the slots M. Bar 6 is placed in contact with annular member 3 and is rigidly fastened to pivot N; this bar is provided with teeth which engage with the teeth of wheel $g$, which latter acts to push the bar radially and peripherally, as previously described. The length of travel of the bar 6 and consequently, of the quadrants 2 and chain ground engaging elements E, is just such as to bring the elements clearly across the tread surface of the tire T.

In applying the road engaging means in this modification, the handle $h$ (illustrated in Figure 1) is pushed to the left and the rod L also moves to the left, causing the links K to push the shoes 9 in contact with the friction surface 5 of the wheel 4. The rotating wheel and tire T ordinarily rotate uniformly with wheel 4. However, shoes 9 pressing on surface 5, retard the motion of the wheel 4, and it therefore, rotates relatively to wheel bearing tire T, thus causing wheels $e$, $f$ and $g$ to rotate and move the bars 6, their attached pivots N, quadrants 2 and road engaging elements E radially. The result is that the elements E are moved from their off position at the side of the tire T to the dotted position shown on the tire tread at the top of Figures 4 and 5. Sufficient pressure is applied to hand lever $h$ to cause the pivots N to travel the full length of the slots M in radial members $l$ and $a2$ in annular member 3. The ends of those slots prevent the elements E from travelling farther than a position squarely across the tire tread or road engaging surface. Most emergencies arise when the car is in motion and require the use of chains or ground engaging means. For instance, if the car is travelling at high speed and suddenly and unexpectedly encounters a sheet of ice, the chains described in this modification may be applied in a fraction of a second while the car is moving at full speed. This will save many lives. In order to remove the chains, it is only necessary to stop the car and run it backwards for a short distance while the lever $h$ is again pressed to the left. Or, by using the apparatus described in connection with Figures 8a and 8b, they may be removed while the car is in motion. It is never neecssary to remove the chains with great haste in an emergency, but it is very often life saving to apply them in the fraction of a second, as described in the present specification. The chains therefore may be returned to their "off" position by the simple procedure above described, and the ordinary tire surface is placed in engagement with the road, as the wires $w$ are buried in the grooves in the tread surface of the tire.

Not all of the chains may be attached and moved by the pivot N. Figure 4 illustrates the fact that the cross chains $w2$ may be attached to the elements E and also attached to a set of chains consisting of the ordinary wire $w$ and road engaging elements E, but not attached to a pivot N. When the various pivots N, in their slots, move all of the wires $w$ radially, then the wires $w2$ will cause another loop of wires to move radially and its elements E brought on the tread surface of the tire. To compensate for the slackness brought about by moving the wire $w2$ from the tread surface, slack adjusters provided with springs S1 are utilized, so that the wires $w2$ are tightened up and there is no "rattle" in the "off" position. Figure 4 shows that when the bars 6 are moved radially, the pivot N which is fixedly attached to the bars 6 and the wire $w$, cause the latter bearing the elements E to move radially and mount the latter elements on the tire tread. Pivot N is forced radially by members, or quadrants, 2 bearing slots $a1$ which engage with pivots N. The pivot N is guided radially by the radial slots $a2$ in the annular member 3. It will be noted that pivot Na travelling in slot M of radial member 1 is fixed to the bar 6, which acts to hold pivot Na at right angles rigidly. The other pivots N are not attached to bar 6, but may be attached to a substitute plate bar.

In Figure 5, members 1 and 3 at their joining may be used as a tread and a strip of rubber or the like, $n2$, mounted thereon, and act as a wheel in case of a blow out, and the car brought to a garage without injury to the inner tube, tire or wheel rim, as well as avoiding a serious accident.

Figure 4 shows that special ridges $r1$ may be provided in the sides of the tires, between which a groove of just the exact dimensions as $i$ may be used to hold and guide the elements E when not on the tread surface.

Figure 4a shows a plan view of the road engaging elements E, Ea and plugs $w1$ located on the tread surface of the tire. $i$ is the groove $w$ the wire, which may consist of a wire, a chain, or several strands of piano wire twisted together located in the groove. T is the tread surface of the tire. E represents a stout metal plate provided with sharp teeth or any ground gripping structure, Ea represents a square piece of material such as that of which "rubber chains" are made, while $w1$ is the plug which fills up the groove and maintains tread surface continuity and may be made of the same substance as the tire tread and thus participate in the usual wear and accommodate itself to the diminished thickness of the latter. Plugs $w1$ also clear the grooves $i$ of dirt and the like, besides completely filling the grooves $i$ when the elements E are in the "off" position. The plug $w1$ may be in one long single piece instead of in short sections, as illustrated. Figure 4b is a side cross-sectional view of Figure 4a, showing the tongue of E embedded in the groove $i$ and wire $w$ passing through it. It may not be desirable to have E's tongue extend to the bottom of the tire groove $i$, as when the rubber of the tread wears, it would be lifted too much out of the groove. If the tongue did not extend to the groove bottom, the flat plate like portion of E would always be in firm contact with the tread surface of the tire regardless of the tire wear. E may be fastened to the wire $w$ by means of set screws and the same is true of the plugs $w1$. Wire $w$ may be provided with a slack adjusting section having a spring or the like, so that it would always be taut around the tire. The wire $w$ may be provided with collar holding elements E, Ea, and $w1$ firmly in position thereon.

The present day balloon tires, due to their large diameter, would permit of different types of road engaging means, i. e., a section containing E, another containing Ea and a section of plugs $w1$. This is illustrated in Figure 5a, wherein metal elements E are about to come into engagement on the tread surface, "rubber chains" Ea are in engagement, while the plugs $w1$ have been removed from the tire tread. Thus different types of road engaging elements may be provided successively to suit the type of road surface.

If desired, a ring might be attached to the rim of the tire at its outer side and provided with pulleys or the like directly opposite the ends of the grooves $a2$ in the annular member 3. This would act to brace the wires $w$ on both sides of the tire. It is also very important that the wire $w$ should not touch the side of the tire. This ring could be rather thin and supported by radial arms from the tire rim.

The plugs $w1$ of Figures 4 and 5 perform several functions: maintain continuity of the tread surface when the chains are in the off position, keep the slots I clear of dirt, etc., keep up the tautness of the wire $w$ when the elements E are in the off position. As they are not always in position in the grooves $i$ (when the "chains" are in the off position) they will not be subjected to the same wear as the tire surface and may be a little more prominent than the tire tread and thus act as tire chains, that is of the so-called "rubber" type.

The portion of the element E shown in the groove I in Figure 4b may not be made of metal; it might be of the same material as "rubber" chains. It should not reach the bottom of the groove $i$ in a brand new tire, in order to compensate for tire wear.

Figures 6, 7 and 8 represent another modification of the invention. However, Figure 8 will serve also as a representation of much of the modification disclosed in Figures 1 and 2. The handle $h$, Figure 6, pushed to the left, causes a similar movement of rod L, which also moves lever $v$. The latter lever is journalled in backing plate hub P, and passes through the hub and is then bent peripherally, whence it is connected with the friction band u, which latter passes around the hub of the wheel 4 and is in turn fastened in the backing plate P by rivet z. The lever tightens the band around the hub of the wheel 4, and retards or stops its motion, as previously described. However, Figures 6 and 7 illustrate a difference between wheel 4 and that previously described and illustrated, in that it is mounted upon the surface of the brake drum D and is freely movable thereon, using if desired, ball bearings for this purpose, as illustrated at q in Figure 10. Wheel 4 meshes with wheel y mounted on shaft b, whose end is squared, and which projects through an opening in the wheel W, or between its spokes. This squared end may be operated by means of a wrench as previously described, for instance, if the car is stalled and the wheels for one reason or another, not rotating. Turning of shaft b causes all of the road engaging means to be applied by the energy of the operator. Wheel e is also mounted on shaft b. Wheel e meshes with and drives rack on bar 6 and moves it together with quadrants 2 peripherally, as already described. The same cup C and radial arm I construction is used as before. Quadrants 2 are provided with slots a in which travel the guides G, as the quadrants move peripherally and centrally. The quadrants are also provided with lugs p, which pass through slots a2 in member 3. These lugs are fastened to the bars 6, and the latter are also secured by the screws s to the flange F. Springs 8 are attached to the member 3 and the quadrants 2 and act to return them centrally when the pawls 7 are released. The latter is brought about by pushing level handle h to the right when shoe J comes in contact with the flanged ring A, thus retarding its rotation sufficiently to move it against the springs B and releasing pawls 7 from engagement with the ratchets Q, as previously described. It will be noted that ring A is fastened to pawls 7 by pivots m. The main difference between this modification and that of Figures 1 and 2 is that the hollow wheel W is mounted on the external surface of the brake drum D and a friction band u encircles the hub-like hollow extension of wheel 4.

Figure 8 illustrates the outer aspect of the road engaging means with the wheel applied but partially broken away, the broken line T represents the periphery of the removed tire, while W represents a portion of the wheel disk which has been largely broken away. S is the shaft. D is the drum. The bolts k fasten the wheel disk W to the brake drum in the conventional manner, while the cup-like center C of the road engaging means is bolted by means of bolts j to the seat formed in the drum D underneath the wheel W. The squared ends of the shafts b, for engagement with wrenches o, are shown through openings in the wheel W. The guides G formed on the radial arms I are shown passing into the slots in quadrants 2 and fastened on the opposite side by the cotter pin, or the like Z. When the wheel W is mounted, the road engaging means cannot be seen, as indicated by the broken line T. The quadrants 2 are shown in the off position. The manner of forming guides 38 in the body of 2 is very important, as they further guide the quadrants 2 with great precision to and fro radially. The annular member 3 is shown on the opposite side of the quadrants 2. The quadrants are seen to be grasped firmly between radial members I and annular member 2. The annular member 3 acts to distribute the pressure uniformly around the periphery of the road engaging means and wheel. The flanges of the quadrants 2 are shown provided with rubber cushions c and the metal paddles I provided with teeth, as better illustrated in the lower portion of Figure 7. The paddles may be supported by the braces d.

The friction between surfaces 5 and 9 is directly opposed to the resistance of the road surface to the peripheral travel of bar 6 and the road engaging means c, etc. When the "rubber" chain c comes into contact with a concrete surface, it is met with great resistance. If great pressure is maintained against surface 5 by means of 9, the "rubber chain" becomes compressed and the teeth of the metal road engaging element I come into engagement with the road surface, for instance if the concrete is coated with ice. Further pressure would cause the wheel to be raised off and free of the road surface. In other words, there is a balance between the opposed forces consisting on the one hand of the friction between 9 and 5, causing the road engaging element to press against the road surface, and on the other hand of the resistance of the road bed. If the proper degree of friction is maintained, the teeth will engage with the road surface, after the cushions c have been found inadequate. If the road is soft, moderate friction between 9 and 5 causes a further travel peripherally by the road engaging element unresisted into the soft earth or snow until sufficient resistance is encountered to cause the road engaging element to effectively engage and the car moves forward. This is equally true if the car is standing perfectly still with the road engaging means in ineffective engagement and the wheels rotating. Further pressure on the handle h causes the friction to be maintained until the ineffectively rotating wheels engage as the road engaging means travel peripherally. Thus, the most suitable type of road engaging means is effectively applied.

Although it was stated in connection with Figures 4 and 5, that it was not vitally necessary to remove the road engaging means while the car was in motion, grave emergencies, however, may be avoided by applying the road engaging means while the car is in motion. Although no means of removing the engaging means was illustrated in connection with Figures 4 and 5, it being only necessary to stop the car off the road and run it backwards while pressure was applied between 5 and 9, means for removing this type of road engaging means while the car moves will be described. For instance, in Figure 4, teeth may be provided on the extending flange of wheel 4, which engages with a gear wheel on the car body and operated by a motor or the car engine. This will cause wheel 4 to rotate in the opposite direction either while the car is standing or moving. In the latter case, the excess of speed of the wheel on the car body over that of the moving wheel, will cause the wheel 4 to rotate and remove the chains to the "off" position.

Figure 8A:
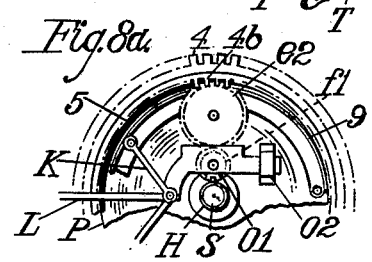
Figure 8a illustrates another modification of the invention being an elevational view of means for removing the road engagement means from engagement.
Figure 8B:
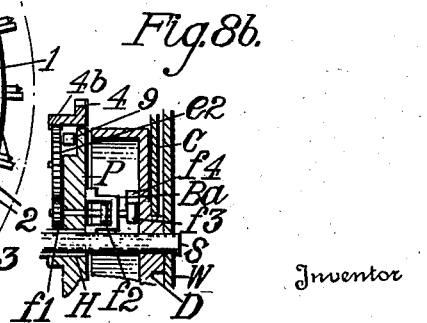
Figure 8b is a side view of Figure 8a partly in cross-section.

No road engaging means is illustrated in Figures 8a and 8b for the reason that not only the road engaging means E, Ea of Figure 4 may be used, but also other road engaging means. Also, the apparatus of Figures 8a and 8b perform the function of release of the road engaging means. Therefore, ring A, shoe J, pawls 7, and ratchets Q might be dispensed with.

In Figures 8a and 8b, S is the shaft, H the torque tube, P the backing plate, D the drum and C the cup-like portion of the road engaging supporting frame. Engagement is brought about by moving rod L to the left causing links K to force shoes 9 against surface 5 of wheel 4, retarding its motion while the wheel W rotates, as already described. To release the road engaging means, from road engagement, rod L is pushed to the right, releasing friction between 5 and 9, causing cam O1 which is provided with a wedged shape or inclined plane on its under side in the drawings, to push in on wheels f1 and e2, bringing wheel e2 into gear with wheel 4b on the internal surface of wheel 4 and external to the friction surface 5, the two (wheel 4b and surface 5) being juxtaposed. This action also brings wheels f2 and f3 to the right in Figure 8b, and f3 is brought into gear with wheel f4 attached to the surface of the brake drum D. Wheels f1, collars f2 and f3 are fixedly mounted upon the same shaft. This shaft is journalled in the plate P and also in the bracket Ba. The cam O1 is mounted upon a rod which is shown sliding in guide O2. The inclined surface of the cam O1 forces wheels e2, f1, and f3 to the right (Figure 8b), causing wheel f3 to engage with wheel f4 mounted on the inner surface of the drum D. This causes the rotating drum D to rotate wheels f4, f3, f1, e2, 4b and 4, the latter in a direction in reverse to that accomplished by the action of elements 9 and 5. The relative diameters of the wheels just mentioned is such as to cause wheel 4 to rotate backward or in reverse to the forward motion of the car wheel W. The chains or other road engaging means are removed, due to the fact that the bar 6 is moved centrally. Wheels f1 and f3 are normally held out of engagement with wheels e2 and f4 respectively by the action of the spring (not shown) located between the collar f2 (fixedly mounted on the same shaft with wheels f1 and f3) and the bracket Ba. It will be noted that wheel f4 is of large diameter compared to that of wheel f3 and will rotate many times faster. Friction wheels may be substituted for those and others described in the present specification if desired. Thus when the full limit of travel of pivot N (see Figs. 4 and 5) is reached there would be a slipping of the friction gear wheels.

Shoes 9 by a left hand motion of rod L cause wheel 4 to be retarded while wheel W rotates, while a right hand movement of rod L causes wheel 4 to move in the same direction as the rotating wheel W but in excess of the rotation of the wheel W, and the chains of Figures 4 and 5 are moved to the off position.

If desired, the backing plate P might be rather thick and recesses formed in it to accommodate the shoes 9, as illustrated in Figure 8b.

Figure 9:
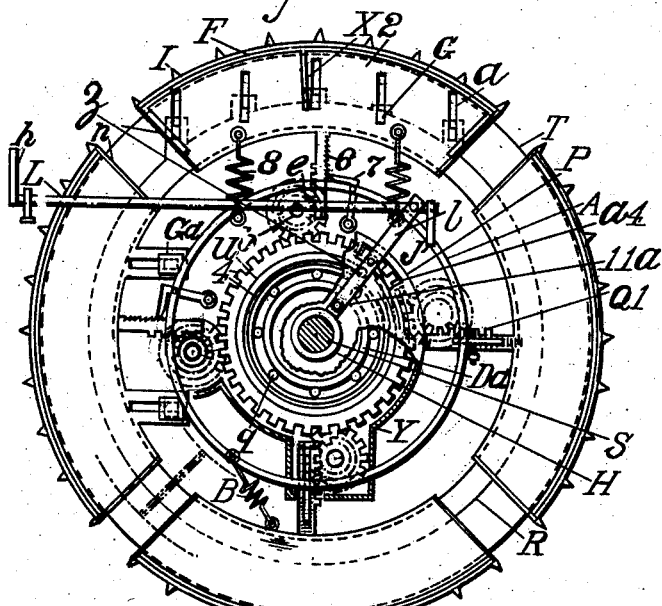
Figure 9 is an elevational view of another modification of the invention.
Figure 10:
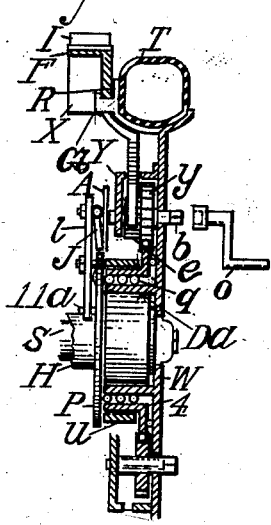
Figure 10 is a side view of Figure 9, partly in cross section.

Another modification is illustrated in Figures 9 and 10, in which the road engaging means is applied directly to the wheel W. S is the shaft; H is the torque tube and Da is the drum which here forms one piece with the wheel body. Hollow gear wheel 4 is mounted upon the drum Da. Ball or roller bearings q may be placed between the wheel 4 and the drum Da. The plate P is shown as mostly broken away in order to expose the various elements forming the road engaging supporting means. The lever l is pivoted by pivot 11a to the plate P, and is fastened by a pin to the band u. The other end of the band u passes around the hub or extension of wheel 4 and is fastened by pin z to the plate P. The pin which fastens band u to lever l passes through the slot shown in plate P. Pushing the handle h to the left causes rod L to move to the left and moves lever l which acts to tighten the band u on the flanged hub of wheel 4 and retard its motion when wheel W is rotating. The result is that wheel 4 causes wheels y and e to rotate, as they are mounted upon the same shaft. Wheel e causes bar 6 to move radially against the action of the powerful springs 8, while pawls 7 in engagement with the ratchets on bars 6, hold the latter in the position of farthest radial travel. Thus quadrants 2 with their flanges F bearing road engaging means are applied to engagement with the road surface. Rod L is rotatably mounted. Therefore, by turning handle outward to the observer in the drawings, shoe J is pressed against the ring A, which is thus retarded in its motion causing it to move against the action of springs B and to release pawls 7, to which it is pivoted, from engagement with their corresponding ratchets, when springs 8 pull the quadrants and their road engaging means centrally. All pawls are released simultaneously, and all quadrants return uniformly as they are all geared to wheel 4. Cushions n are provided between the quadrants in order that they may return noiselessly and that they will not produce a "rattle" when in the off position and the car is in motion. A suitable casing, such as Y, protects the various gears from mud and water. Those figures illustrate the fact that the road engaging means may be provided with a separate flange Fa from the quadrant. The flange is shown as being provided with teeth I. Different flanges bearing different types of road engaging means may be removed and applied at will. Additional paddles are shown at X, which are placed internally to the flanges, and will readily engage in deep mud and the like. Guides, G and Ga are shown mounted upon the wheel body and rim and engaging with the slots a in quadrants 2. Those guides are provided with flanges as shown at Gb, which hold the quadrants in place. Pawls 7 are directly mounted upon the wheel body. The wrench o intended for engagement with shaft b and shaft b7 (Figure 11) for manually applying and removing the road engaging means is illustrated in Figure 10. Figures 9 and 10 show the road engaging means in road engagement position, the periphery of the tire is shown at T. The casing Y, besides serving to keep out mud and water, etc., also serves to provide guiding support for the bars 6 in the form of an opening just sufficient to accommodate the bar, as shown in the upper portion of the drawing of Figure 10 at Y, the openings acting as a guide.

Figure 11:
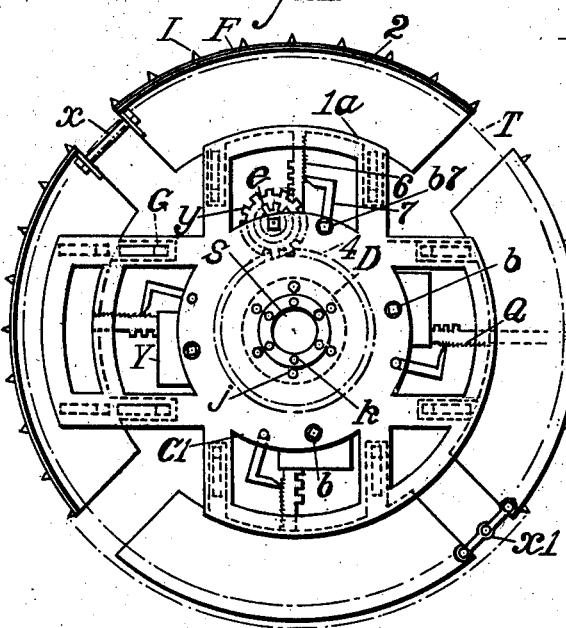
Figure 11 is an elevational view of another modification of the invention.
Figure 12:
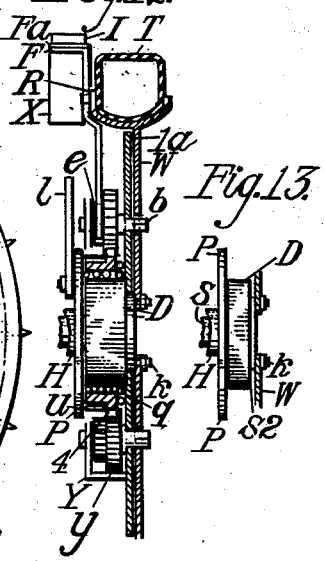
Figure 12 is a side view of Figure 11 partly in cross section.
Figure 13:
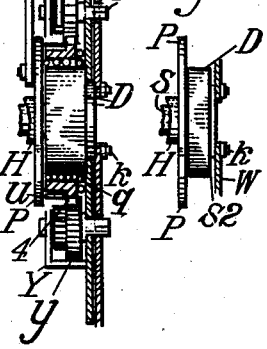
Figure 13 is an elevational view of an automobile to which the invention may readily be applied.

Figures 11 and 12 illustrate another modification in which the road engaging means is attached to a specially formed seat in the brake drum, as described in the earlier portions of this specification. Figure 11 represents the outer aspect of the road engaging means with the wheel entirely removed, i. e., dismounted. S is the shaft; k are the bolts from which the wheel has been dismounted. The disk like portion of the road engaging means is illustrated at C1. The bolts holding this to the seat in the drum are shown at j. The drum D which is on the opposite side of C1 is shown in dotted lines, as is also the wheel 4. The mounting of wheels e and y on the squared end shafts b is clearly shown. The squared ends of the pivots b7, for manual release of the road engaging means, are shown. The quadrants 2 are also shown as braced together by the links x and the hinged links x1, in order to distribute the pressure throughout the entire periphery of the road engaging means. x is in the form of a double headed rod which slides in holes in the quadrants 2, while it consists of two rods pivoted together and to the quadrants 2, which fold up when the quadrants are drawn in in the disengagement of the apparatus from road engagement position. The tire periphery is indicated by the broken line T. The ratchets borne on rods 6 are shown at Q. The guides G are shown on the radial arms (which are here shown as being fenestrated to reduce weight). The gear casing with its guiding hole for bar 6 is shown at Y. The radial arms are here designated by 1a. Figure 12 clearly shows the body of the road engaging means at 1a as being closely adjacent the wheel body or disk W. The removable flange and special road engagement element is shown at Fa, Figure 12. The lever l is attached, as already described, to the band u, however, this attachment is not shown in Figure 12. Figure 13 shows the ordinary drum and wheel disk with the road engaging means entirely removed, the seat for the latter is shown at S2. The wheel W is shown as fastened by the bolts k to the drum over and above the seat S2. The backing plate is illustrated at P. S is the shaft and H is the corresponding shaft torque tube.

Figs. 14 and 15 illustrate a modification of the invention in which an auxiliary tire is utilized, bearing special road engaging means on its tread, either on the same shaft or on the same rim as the regular wheel and tire. Everyone is familiar with the great destruction of life due to so-called "blow outs" of tires. This is due to the fact that the diameter of the tire suddenly reduces from that of full inflation to absolute deflation, with a consequent turning of the wheels toward the side of the road and the upsetting of, or the crashing of the car with external objects. The regular tire is shown at T, and in the off position of the road engaging means, it is of larger diameter than the auxiliary tire T2, due to the deflation of the latter. The mechanism for actuating the wheel 4 is the same as that already described in previous figures. Rod L, through links K force the shoes 9 against the friction surface 5 of wheel 4. Wheel 4 is supported, as already described by the wheels e, e1, etc. S is the shaft, while H is its torque tube, and O is the hinged circle, which passes around the tube H, formed in rod L. The rim of the regular tire is shown at R, while that of the auxiliary tire or wheel is shown at R1. The brake drum is shown at D and the backing plate at P. As wheel 4 is retarded in its motion, it causes wheel e1 to rotate. An air pump 20 is attached to this wheel and is operated by the rotation of this wheel e1 to inflate tire T2 as shown by the usual connection. Thus tire T2 is brought up to the same or greater inflational diameter than tire T and the special road engaging means on its surface is brought into road engagement. Obviously, the greater the speed at which the car is moving, the greater the speed of inflation of the auxiliary tire that is possible. The rate of inflation may be regulated by the amount of pressure brought upon the friction surface 5 by shoes 9. Pump 20 is clearly shown as connected to tire T2, similar to ordinary tire pumps. Thus the special road engaging means, which may not have a long life is used only when necessary, and the regular tire used alone. For instance, special tire surfaces are made of fine vanes, which grip especially wet concrete roads, and such are not subjected to constant wear with the present invention, but are only in use when needed. The auxiliary tires may also be provided with regular chains, and only inflated when needed. This saves the breaking of chains through wear on concrete and other hard roads when not covered with snow or ice. The auxiliary tire may also be provided with the very special large ridges as used on the well known "ground grip" tires. These are therefore, used only when needed, and are saved useless wear. Also such heavy ridged tires give great vibration on hard roads, such as clean concrete roads, even giving the same sensation as that given by flat tires.

Counterpoises may of course be provided opposite pumps 20, or the two pumps might be, if used on the same car, counterpoised against each other, as shown in Figure 14.

To deflate the auxiliary tire and thus remove the road engaging means from the position of road engagement, the rod L is pushed to the right when shoe J on the end of the rod comes in to contact with ring A1's friction surface, and retards its rotation if the car is in motion. The ring is provided with a cam 22, which comes thus in contact with the valve stem p2 and pushes it inwards, causing the escape of the air and consequent deflation. The ring A1 is provided with a series of slots a3 in which the pins p1 travel while the ring A1 moves against the action of the springs B, which normally hold the cam 22 out of engagement with valve stem p2. Two sections of the ring A1 are shown at the right and left of Figure 14. It will be noted that wheels e are used merely to support the wheel 4.

It has been stated above that pump 20 may be used to inflate the regular tire T while the car is in motion, by simply connecting it to the tire by a screw joint, for instance. The apparatus just described is shown mostly in cross section in Figure 15. The relative diameters of tires T and T2 are shown for purposes of clearness. It will be seen that tire T2 is not in road engagement in this figure, and is saved unnecessary wear. It is well known that chains, for instance, do not wear out nearly so quickly when in contact with soft, or dirt or snow covered roads. Their wear is exceedingly rapid on clean concrete and similar surfaces. In winter it is frequently necessary for a person to travel, during various journeys, over many alternate sections of clean, and snow and ice covered roads. The chains must be kept on the tires, otherwise they cannot travel through snowy sections, and the ordinary chain is too cumbersome and takes too much time and effort to remove at say half hour intervals. With the present invention, the "chains" may be removed and applied several times in one minute and while the car is in motion.

Figure 15 also shows the two tires T and T2 mounted upon the same wheel W by means of a two-element rim R and R1. If the regular tire T should blow out while the car is travelling at high speed, then T2, which is somewhat softer and of consequent smaller diameter, even though not in road engaging inflation, would act to prevent the car from swerving off the road.

In another modification, tire T2 is mounted upon a separate wheel, which latter is mounted upon the shaft S, or its disk portion may be mounted upon wheel W.

Attention is particularly called to the simplicity and great utility of the type of road engaging supporting and releasing and applying means illustrated in Figures 1, 2, 3, 4, 8a, 8b, 14 and 15. Referring to Figure 2, it is readily seen how easily the hollow surface 5 of wheel 4 is slipped opposite the periphery of the backing plate P, while the bolts $j$ fasten its cup-like member C to the seat in the brake drum. The two shoes 9 are then attached to the plate P by means of the two bolts shown at their right extremities in Figure 1. The rods or links K are then attached to 9, and the wheel W is then mounted in the conventional manner. The car is by the above simple operations, taking only a few seconds, provided with a very effective road engaging means.

Although it is stated in this specification that the radial members may fit against the tires, still this is not absolutely necessary, and it may even be objectionable. They may even be absolutely free of contact with the tires. Even in the modification in Figures 4 and 5 they may be held by or supported by the pulleys V and pivot N and an additional group of pulleys supported by rim R and directly opposite the ends of the slits in the annular members 3 and 1, and the wires $wl$ and the chain contact elements E held free of the tire except at the tread surface.

When the car is stalled in soft mud, or the like, it may not be desirable to apply the road engaging means by rotating the wheels, as a firm foot hold may not thus be possible. In such case the road engaging means may be applied in road engagement by applying the wrench $o$ to any one of the shafts 4 (squared ends) and causing the road engaging means to come into road engagement while the wheel is stationary, and thus get a very firm footing.

The handle $h$ is of course, at the driver's seat. The rods L may be connected by a cross rod Le, and a single rod Lg connecting the cross rod and the handle $h$ at the driver's seat, somewhat similar to the old fashioned carriage or wagon brakes. The rod L is mounted upon the car body in any manner, for instance similar to the old horse and buggy arrangement. It may pass through supporting guides La, Lb and Lc, as shown in Figure 1. The holes shown in those guides accommodate screws or bolts, which fasten them to the car body. Shoe J is carried on the end of the rod L and makes frictional contact with the ring A. Those elements are also illustrated in Figure 3A, in which Bd represents the car body to which the supporting guides are attached by suitable screws or bolts, etc. Also cross rod Le is fixedly attached to the usual lever Lf.

Having described my invention, I claim as new and desire to secure by Letters Patent:

1. A road engaging apparatus consisting of a rotatable member, an auxiliary road engaging means mounted independently of and immediately juxtaposed to said rotatable member and means for making occasional contact at will with said auxiliary road engaging means while said auxiliary road engaging means rotates in order to expand the periphery of said auxiliary road engaging means to any desired fixed degree of expansion in order to bring said auxiliary road engaging means into uniform road engagement.

2. A road engaging apparatus consisting of a rotatable member including a brake drum, an auxiliary road engaging means detachably mounted solely upon said brake drum, and means for making occasional contact at will with said auxiliary road engaging means while said auxiliary road engaging means rotates in order to expand the periphery of said auxiliary road engaging means to any desired fixed degree of expansion in order to bring said auxiliary road engaging means into uniform road engagement.

3. A road engaging apparatus consisting of a rotatable member, an auxiliary road engaging means mounted independently of and immediately juxtaposed to said rotatable member and means for bringing said auxiliary road engaging means into road engagement including a hollow gear wheel and friction members in cooperative relation with the hollow surface of said wheel.

4. A road engaging apparatus consisting of a rotatable member, an auxiliary road engaging means, mounted independently of and immediately juxtaposed to said rotatable member means for making occasional contact at will with said auxiliary road engaging means while said auxiliary road engaging means rotates in order to expand the periphery of said auxiliary road engaging means to any desired fixed degree of expansion in order to bring said auxiliary road engaging means into uniform road engagement and means for releasing said auxiliary road engaging means from road engagement.

5. A road engaging apparatus consisting of a rotatable member including a tire and a plurality of grooves in said tire, an auxiliary road engaging means encircling said tire and in cooperative relation with said grooves and means for bringing said road engaging apparatus into road engagement.

6. A road engaging apparatus consisting of a rotatable member including a tire and a plurality of grooves in said tire, an auxiliary road engaging means including a flexible member travelling in said grooves, a plurality of road engaging elements borne on a portion of said flexible member and means for moving said flexible member to bring said road engaging elements into road engagement upon said grooves.

7. A road engaging apparatus consisting of a rotatable member, an auxiliary road engaging means mounted beside said rotatable member and means for making occasional contact at will with said auxiliary road engaging means while said auxiliary road engaging means rotates in order to expand the periphery of said auxiliary road engaging means to any desired fixed degree of expansion in order to bring said auxiliary road engaging means into road engagement, said means for bringing into engagement including a hollow gear wheel and a friction member in cooperative relation with said hollow gear wheel.

8. A road engaging apparatus consisting of a rotatable member including a tire and a plurality of grooves in said tire, an auxiliary road engaging means encircling said tire and in cooperative relation with said grooves, means for bringing said road engaging means into road engagement and means for releasing said auxiliary road engaging means from road engagement.

9. A road engaging apparatus consisting of a rotatable member, an auxiliary road engaging means including a number of groups of different types of road engaging elements and means for selectively bringing at will any desired group of road engaging means into fixed road engagement while said auxiliary road engaging means revolves said means for bringing into road engagement including a stationary manually operated control element.

10. A road engaging apparatus consisting of a rotatable member, an auxiliary road engaging means mounted independently of and immediately juxtaposed to said rotatable member and stationary means for making occasional contact at will with said auxiliary road engaging means while said auxiliary road engaging means rotates in order to expand the periphery of said auxiliary road engaging means to any desired fixed degree of expansion in order to bring manually said auxiliary road engaging means into road engagement.

11. A road engaging apparatus consisting of a rotatable member, an auxiliary road engaging means, means for bringing said auxiliary road engaging means into road engagement including a plurality of gear wheels, a hollow gear wheel supported by and in cooperative relation with said gear wheels, the internal surface of said gear wheel being a friction surface and a stationary friction means in cooperative relation with said friction surface, and means for maintaining said auxiliary road engaging means in road engagement.

12. A road engaging apparatus consisting of a rotatable member, an auxiliary road engaging means including a movable member, means for bringing said auxiliary road engaging means into road engagement including a plurality of racks attached to said movable member, a plurality of pinions in engagement with said racks, a large gear wheel engaging said pinions, a friction surface borne on said large gear wheel and a stationary friction element engageable with said friction surface to make retarding contact therewith.

13. A road engaging apparatus consisting of a rotatable member, an auxiliary road engaging means, means for bringing said auxiliary road engaging means into road engagement and means for releasing said auxiliary road engaging means from road engagement said means for releasing including a plurality of pawls a friction band flexibly connected to said pawls and a friction shoe in cooperative relation with said friction band and mounted independently of said rotatable member and said auxiliary road engaging means.

14. A road engaging apparatus consisting of a rotatable member, an auxiliary road engaging means, means for bringing said road engaging means into road engagement and means for maintaining said auxiliary road engaging means in road engagement including a plurality of straight ratchets, a plurality of pawls engaging with said ratchets, a ring attached to said pawls and a plurality of springs attached to said ring to insure uniform engagement of said pawls with said ratchets.

15. A road engaging apparatus consisting of a rotatable member, an auxiliary road engaging means, means for bringing said road engaging means into road engagement and means for maintaining said auxiliary road engaging means in road engagement including a plurality of straight ratchets, a plurality of pawls engaging with said ratchets, and means for uniformly releasing said pawls from said ratchets.

16. A road engaging apparatus consisting of a rotatable member, an auxiliary road engaging means, and means for bringing said auxiliary road engaging means into road engagement including a wrench-engageable element adjacent to and accessible through said rotatable member.

17. A road engaging apparatus consisting of a rotatable member, an auxiliary road engaging means, means for bringing said auxiliary road engaging means into road engagement while said auxiliary road engaging means is stationary including a wrench engageable shaft accessible through said rotatable member and means for bringing said auxiliary road engaging means into road engagement while said auxiliary road engaging means rotates.

18. A road engaging apparatus consisting of a rotatable member, an auxiliary road engaging means, means for bringing said auxiliary road engaging means into road engagement while said auxiliary road engaging means is stationary including a wrench-engageable shaft, and means for bringing said auxiliary road engaging means into road engagement while said auxiliary road engaging means rotates, and means for releasing said auxiliary road engaging means from road engagement while said auxiliary road engaging means rotates.

19. A road engaging apparatus consisting of a rotatable member including a brake drum, a peripheral uniformly expandable auxiliary road engaging means, said auxiliary road engaging means being detachably mounted upon the disk portion of said brake drum, and means for uniformly expanding said auxiliary road engaging means in order to bring said expandable auxiliary road engaging means into road engagement.

20. A road engaging apparatus consisting of a rotatable member including a brake drum, a peripherally expandable auxiliary road engaging means, said auxiliary road engaging means being detachably mounted upon the disk portion of said brake drum, and means uniformly for expanding said auxiliary road engaging means to any desired fixed degree of expansion while said auxiliary road engaging means rotates in order to bring said expandable auxiliary road engaging means into road engagement.

21. A road engaging apparatus consisting of a rotatable member including a brake drum, and a uniformly expandable auxiliary road engaging means, said auxiliary road engaging means being detachably and fixedly mounted upon the disk portion of said brake drum and independently mounted of said rotatable member.

22. A road engaging apparatus consisting of a rotatable member including a brake drum, a uniformly expandable auxiliary road engaging means, said auxiliary road engaging means being detachably and fixedly mounted upon the disk portion of said brake drum independently of said rotatable member and means for uniformly expanding said auxiliary road engaging means in order to bring said expandable road engaging means into uniform road engagement.

23. A road engaging apparatus consisting of a rotatable member, an auxiliary road engaging means mounted juxtaposed to said rotatable member and including an expandable peripheral rim, a plurality of toothed metal plates mounted upon said rim and a plurality of resilient road engaging members mounted upon and extending peripherally beyond the ends of said metal plates.

24. A road engaging apparatus consisting of a rotatable member, an auxiliary road engaging means, including an expandable peripheral rim, a plurality of toothed metal plates mounted upon said peripheral rim, a plurality of resilient road engaging members mounted upon and extending beyond the ends of said metal plates and means for expanding said peripheral rim in order to bring said resilient road engaging members into road engagement before said metal plates.

25. A road engaging apparatus comprising a rotatable road-engaging-wheel supporting member, a wheel mounted upon said member and an auxiliary road engaging means separately detachably and independently mounted upon said rotatable supporting member, said auxiliary road engaging means not making any contact with said wheel.

26. A road engaging apparatus comprising a rotatable member, an auxiliary road engaging means, means for bringing said auxiliary road engaging means into road engagement including a plurality of gear wheels, a hollow gear wheel supported by and in cooperative relation with said gear wheels, the internal surface of said hollow gear wheel being a friction surface and a stationary friction means in cooperative relation with said friction surface.

27. A road engaging apparatus comprising a rotatable member, an auxiliary road engaging means including an expansible peripheral rim, a plurality of teeth mounted upon said periphery, a plurality of slotted flanges bearing resilient road engaging elements, said teeth projecting through the slots of said slotted member, a plurality of springs normally separating said flanges from said peripheral rim, and means for expanding said expansible peripheral rim in order to bring said resilient road engaging elements and said teeth successively into road engagement.

28. A road engaging apparatus comprising a rotatable member, a brake drum in cooperative relation with said rotatable member, an auxiliary road engaging means mounted beside said rotatable member, and means for making occasional contact at will with said auxiliary road engaging means while said auxiliary road engaging means rotates and thereby expand the periphery of said auxiliary road engaging means to any desired fixed degree of expansion and bring said auxiliary road engaging means into road engagement, said means for bringing into engagement including a hollow gear wheel rotatably encircling said brake drum and a stationary friction member in cooperative relation with said hollow gear wheel.

ALOYSIUS J. CAWLEY.